United States Patent
Schemitsch

(10) Patent No.: US 8,578,034 B2
(45) Date of Patent: *Nov. 5, 2013

(54) OPTIMIZED NETWORK DEVICE DISCOVERY

(75) Inventor: Richard R. Schemitsch, Raleigh, NC (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 315 days.

This patent is subject to a terminal disclaimer.

(21) Appl. No.: 12/953,645

(22) Filed: Nov. 24, 2010

(65) Prior Publication Data

US 2012/0131211 A1     May 24, 2012

(51) Int. Cl.
*G06F 15/16*     (2006.01)

(52) U.S. Cl.
USPC .......................................... 709/228; 709/229

(58) Field of Classification Search
None
See application file for complete search history.

(56) References Cited

U.S. PATENT DOCUMENTS

| | | | |
|---|---|---|---|
| 7,421,484 B2* | 9/2008 | Das | 709/220 |
| 2003/0069848 A1* | 4/2003 | Larson et al. | 705/50 |
| 2005/0050225 A1* | 3/2005 | Tatman | 709/244 |
| 2006/0274725 A1* | 12/2006 | Freitag et al. | 370/352 |
| 2006/0294257 A1* | 12/2006 | Kumano et al. | 709/245 |
| 2008/0163246 A1* | 7/2008 | Jogand-Coulomb et al. | 719/313 |
| 2008/0256010 A1* | 10/2008 | Moran et al. | 706/46 |
| 2009/0073985 A1* | 3/2009 | Rogers | 370/395.4 |
| 2011/0018704 A1* | 1/2011 | Burrows | 340/538 |

OTHER PUBLICATIONS

Rich Schemitsch, NETCHK v2.2, 2003, MCI managed services.*
Rich Schemitsch, "NETCHK Plus" System Documentation, 3 pages.
Rich Schemitsch, "NETCHK v2.2", MCI®, © Copyright 2003, 17 pages.

* cited by examiner

*Primary Examiner* — Jeffrey M Rutkowski
*Assistant Examiner* — Hardikkumar Patel

(57) ABSTRACT

A computing device retrieves a set of configuration files of devices associated with a network to be analyzed and extracts from the set of configuration files Internet protocol (IP) address information to form an IP address database. The computing device also extracts from the set of configuration files border gateway protocol (BGP) routing protocols to form a BGP routing database. The computing device analyzes the IP address database and the BGP routing database to generate a database of calculated network connection information for the devices associated with the network. The computing device conducts live network discovery, on the network and based on the IP address database, to generate a database of discovered connection information, and merges the database of calculated network connection information and the database of discovered connection information to form a master database from which output files may be generated.

20 Claims, 12 Drawing Sheets

FIG. 4

| HOSTNAME | INTERFACE | IP ADDRESS | MASK |
|---|---|---|---|
| ashburn-gk1 | Loopback0 | 10.xxx.255.7 | /32 |
| ashburn-gk1 | Gigabit Ethernet0/0 | 172.xx.162.25 | /24 |
| ashburn-wan-rtr2 | Gigabit Ethernet0/1 | 10.xxx.255.77 | /30 |
| chespotrtr0001 | Multilink10134 | 10.xxx.101.34 | /30 |
| chespotrtr0201 | Multilink10158 | 10.xxx.101.58 | /30 |
| chespotrtr0701 | Gigabit Ethernet0/0.3 | 10.xxx.64.1 | /22 |

FIG. 5

| HOSTNAME | BGP LOCAL ASN | NEIGHBOR IP ADDRESS | REMOTE ASN |
|---|---|---|---|
| charndcrtr0001 | 65081 | 10.xxx.101.9 | 13979 |
| charsscrtr0001 | 65082 | 10.xxx.101.21 | 13979 |
| chespotrtr0001 | 65042 | 10.xxx.101.33 | 13979 |
| chespotrtr0201 | 65043 | 10.xxx.101.57 | 13979 |
| nhqsndcrtr0501 | 7152 | 172.xx.1.9 | 797 |
| nocalifrtr0001 | 65131 | 10.xxx.242.2 | 13979 |

FIG. 6

| HOSTNAME | INTERFACE | IP ADDRESS | MASK | REMOTE_HOST1 | REMOTE_INTERFACE1 | REMOTEIP1 | ... |
|---|---|---|---|---|---|---|---|
| ashburn-gk1 | Loopback0 | 10.xxx.255.7 | /32 | SELF | SELF | SELF | |
| ashburn-gk1 | Gigabit Ethernet0/0 | 172.xx.162.25 | /24 | ashburn-core-esw2 | Vlan200 | 172.xx.162.2 | |
| ashburn-wan-rtr2 | Gigabit Ethernet0/1 | 10.xxx.255.77 | /30 | ashburn-core-esw2 | Gigabit Ethernet5/8 | 10.xxx.255.78 | |
| chespotrtr0001 | Multilink10134 | 10.xxx.101.34 | /30 | ATTWAN | CARRIER PE INT | 10.xxx.101.33 | |
| chespotrtr0201 | Multilink10158 | 10.xxx.101.58 | /30 | ATTWAN | CARRIER PE INT | 10.xxx.101.57 | |
| chespotrtr0701 | Gigabit Ethernet0/0.3 | 10.xxx.64.1 | /22 | | | | |

410  420  430  440  610  620  630  640
                                      680
                                      650
                                      660
                                      670
                                      690

600

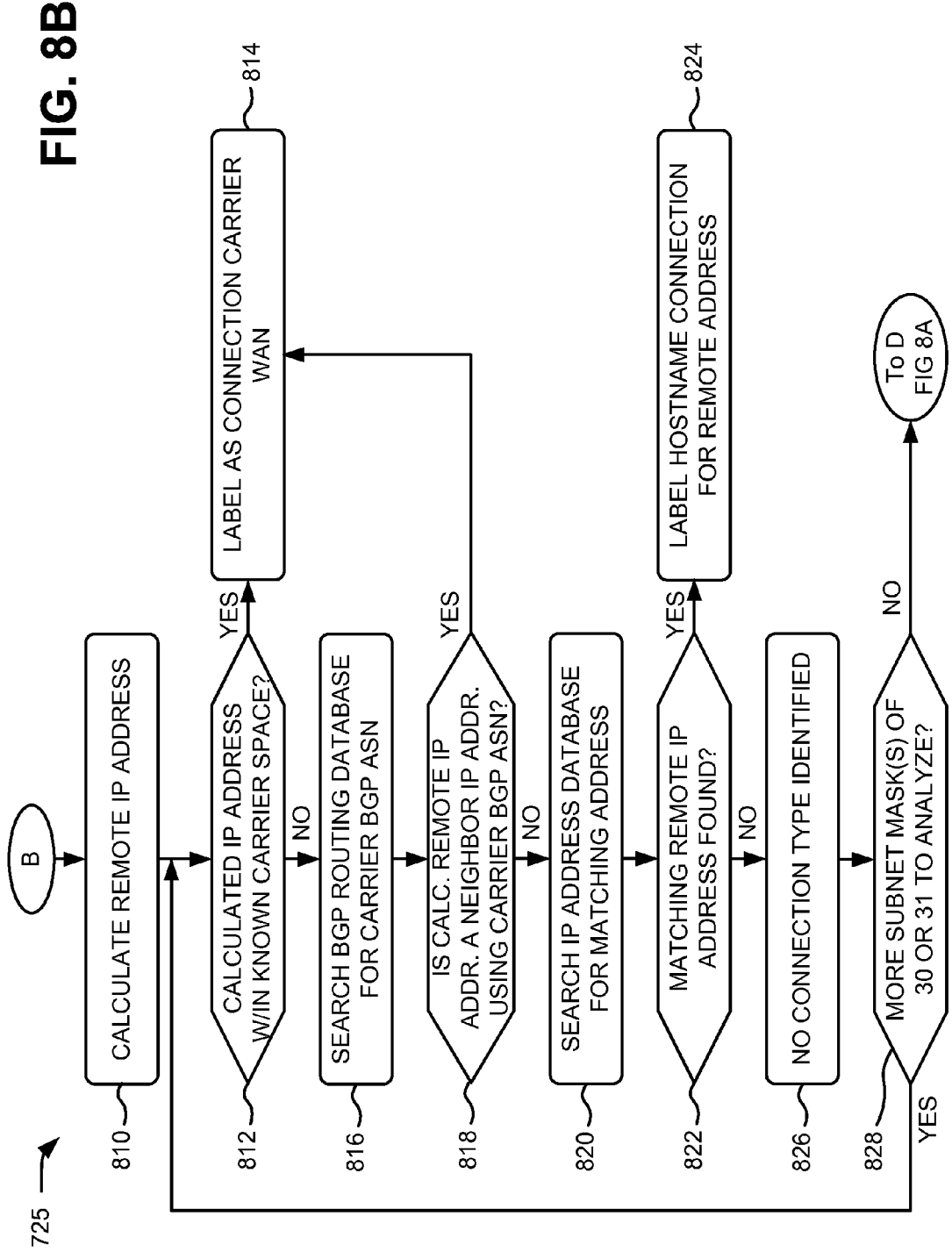

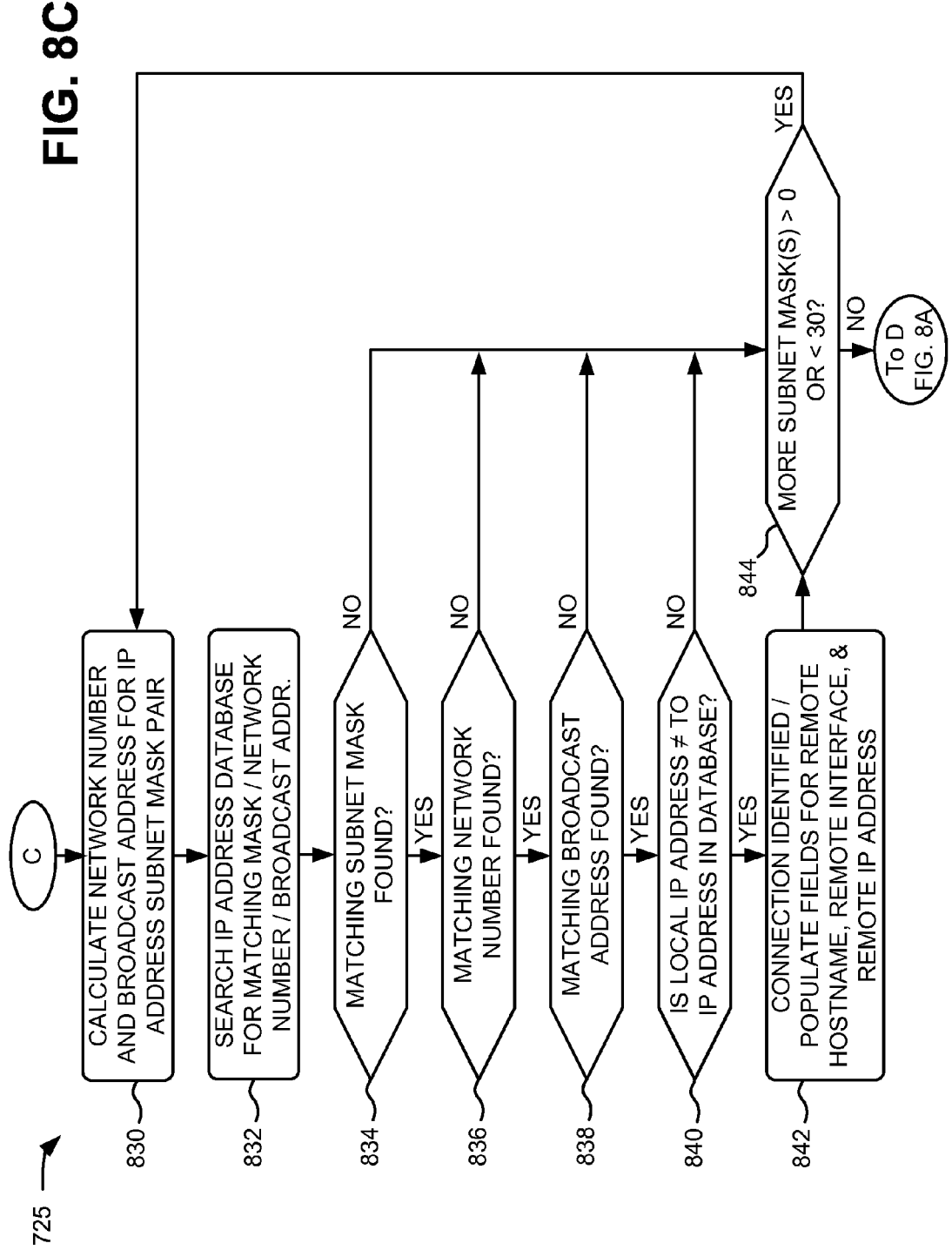

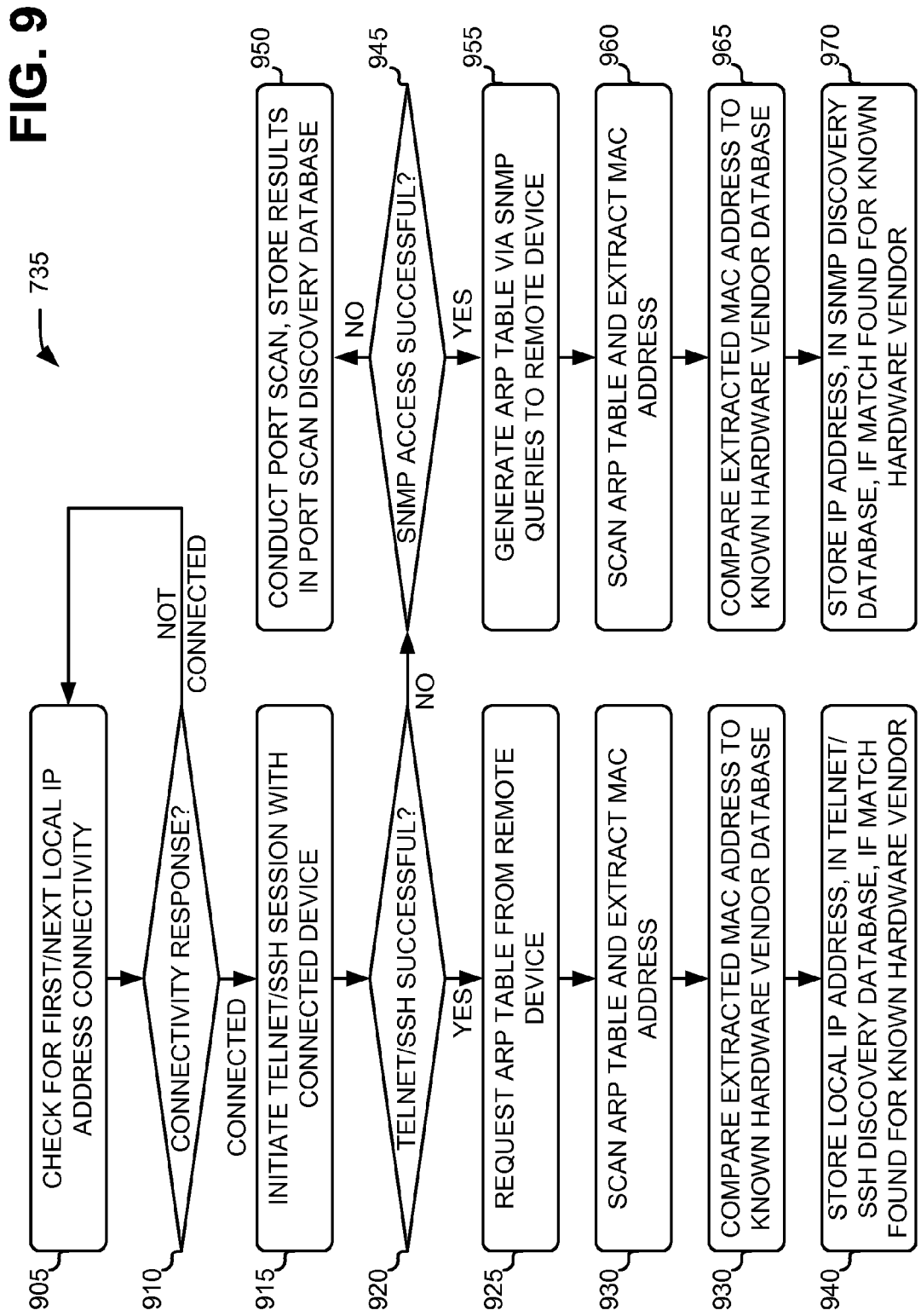

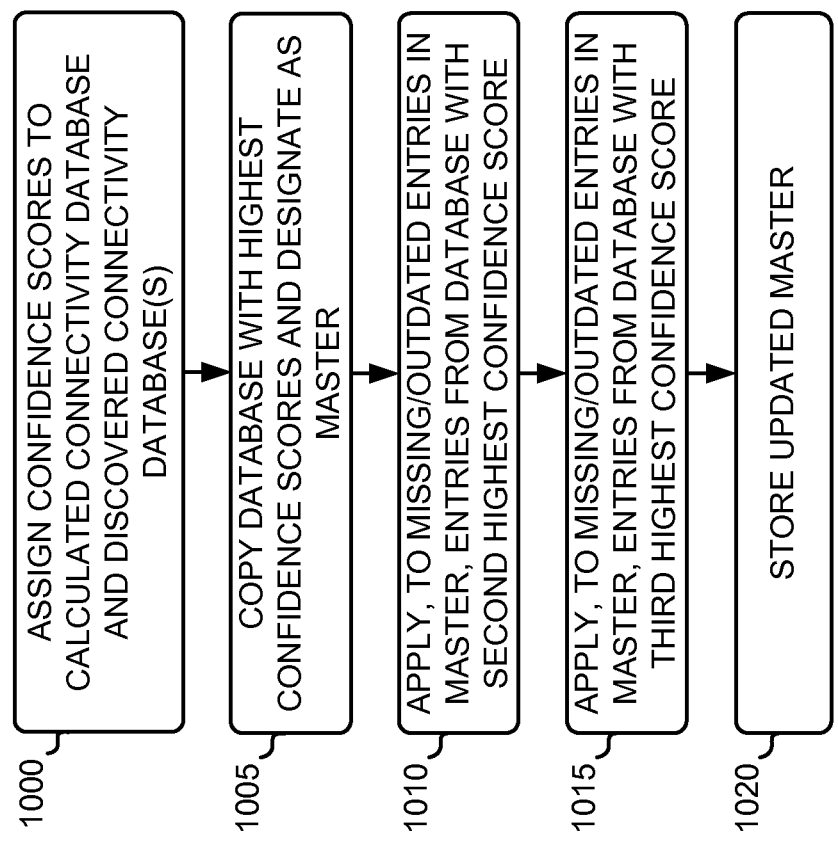

OPTIMIZED NETWORK DEVICE DISCOVERY

BACKGROUND

In a network environment, there may be a large number of network devices (e.g., switches, routers, security devices, etc.). Without accurate information, it can be challenging to perform any type of network administration. Device discovery may be used to determine an inventory of devices associated with a network, and various protocols may be used to facilitate the network discovery process. These protocols typically generate a high volume of network traffic which may be disruptive to other network operations.

BRIEF DESCRIPTION OF THE DRAWINGS

FIG. 4 is a diagram of an example data structure that may be generated by an Internet protocol (IP) address extractor of FIG. 3;

FIG. 5 is a diagram of an example data structure that may be generated by a border gateway protocol (BGP) routing protocol extractor of FIG. 3;

FIG. 6 is a diagram of an example supplemented data structure that may be generated by an address analyzer of FIG. 3;

FIGS. 7-10 are flow diagrams illustrating an example process for performing device discovery in a network according to an implementation described herein.

DETAILED DESCRIPTION OF PREFERRED EMBODIMENTS

The following detailed description refers to the accompanying drawings. The same reference numbers in different drawings may identify the same or similar elements.

Systems and/or methods described herein may provide for optimized network device discovery. The systems and/or methods may provide a connectivity analysis (e.g., of local area network (LAN) and/or wide area network (WAN) device connectivity), without actually being connected to the network, based on analysis of configuration files collected from network devices. Based on the connectivity analysis, the systems and/or methods may connect to the network to perform a targeted device discovery that minimizes intrusion of the network. The systems and/or methods may also identify legacy and advanced network features such as voice-over-IP (VoIP), IP Multicast, and virtual routing and forwarding (VRF)-Lite, which typically influence circuit orders and Layer 3 provisioning.

In one implementation, the systems and/or methods may receive a set of configuration files of devices associated with a network to be analyzed and may extract from the set of configuration files IP address information to form an IP address database. The systems and/or methods may analyze subnets of addresses in the IP address database to generate a database of calculated network connection information for the devices associated with the network. The systems and/or methods may then conduct live network discovery, based on the IP address database, to generate a database of discovered connection information. The systems and/or methods may merge the database of calculated network connection information and the database of discovered connection information to form a master database from which output files may be generated.

Figure 1:
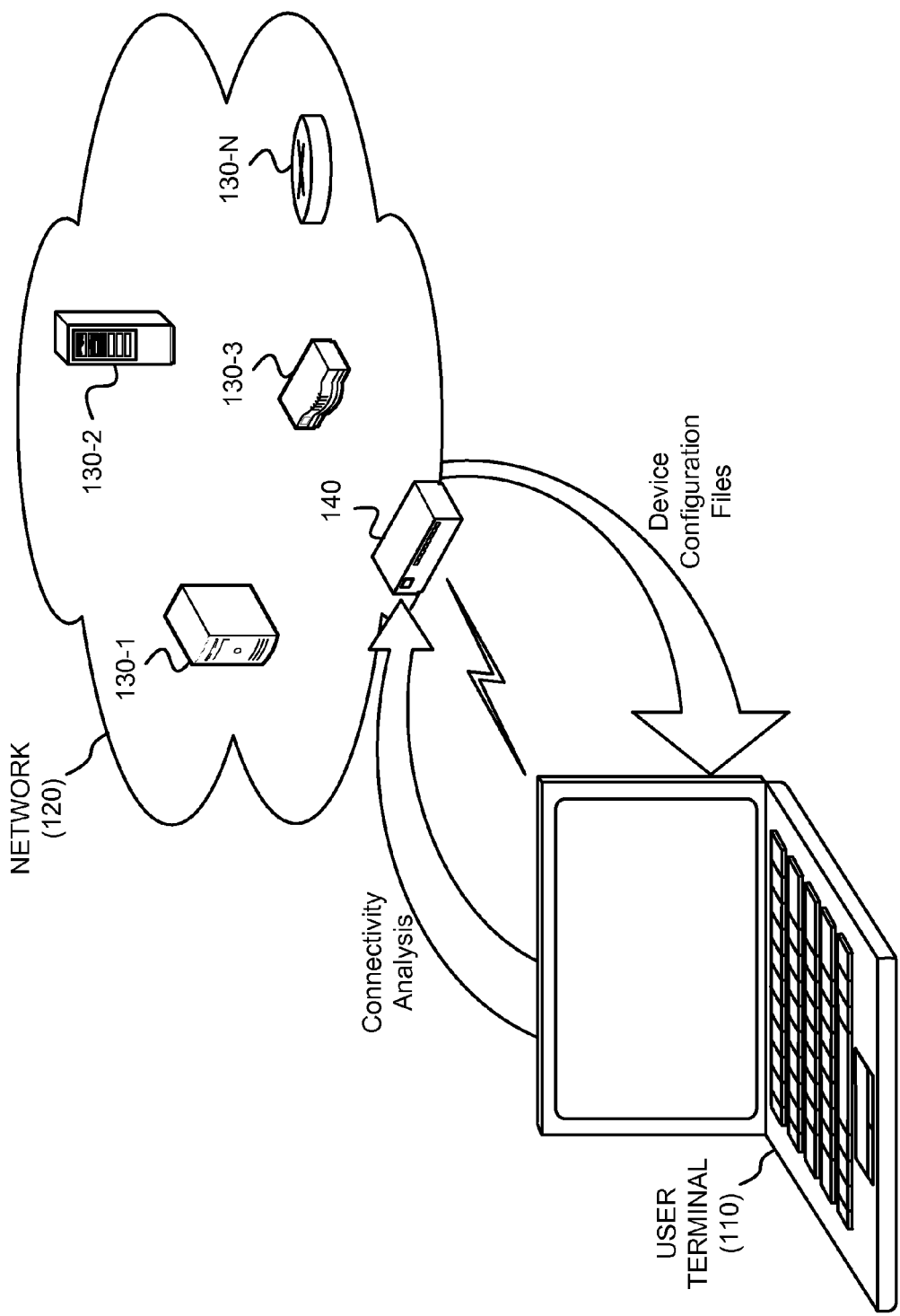
FIG. 1 is a diagram illustrating an example environment in which concepts described herein may be implemented.

FIG. 1 is a diagram illustrating an example environment 100 in which concepts described herein may be implemented. As illustrated, environment 100 may include a user terminal 110 and a network 120. Network 120 may include multiple devices 130-1, 130-2, 130-3, . . . , 130-N (referred to herein collectively as "devices 130" or generically as "device 130") and a network manager 140. One user terminal 110 and one network 120 have been illustrated in FIG. 1 for simplicity. In practice, there may be more user terminals 110 and/or networks 120.

User terminal 110 may include a computational device. For example, user terminal 110 may include a laptop computer, a personal computer, a tablet computer, a workstation, or another type of computation or communication devices. In one implementation, user terminal 110 may generate IP network topology based on an analysis of configuration files from a particular network (e.g., network 120). User terminal 110 may receive the configuration files from network 120 through a manual transfer, a network connection, or another file transfer mechanism. Once the configuration files are received, user terminal 110 may analyze the configuration files independent of any connection with network 120. In implementations described herein, user terminal 110 may use the connectivity analysis (or provide the connectivity analysis to another device, such as network manager 140, to use) to perform optimized device discovery on live network 120.

Network 120 may include a network for which device discovery is desired. Network 120 may include for example, a LAN or a WAN, a private network, or a combination of networks. Network 120 may include various devices 130. Devices 130 of network 120 may interconnect via wired and/or wireless connections.

Device 130 may each include a device having communication capability. For example, device 130 may include a router, a bridge, a switch, a gateway, a computer, a security device (e.g., a firewall), and/or some other type of network device. Device 130 may include various interfaces and/or support various protocols. For purposes of illustration, device 130-1 may correspond to a computer, device 130-2 may correspond to a server, device 130-3 may correspond to a router, and device 130-N may correspond to a switch. Each of devices 130 may include one or more device configuration files (e.g., files used to configure initial settings for applications running on a device).

Network manager 140 may include a device having communication capability. For example, network manager 140 may include a computer, a router, a bridge, a switch, a gateway, and/or some other type of device. Network manager 140 may perform various operations associated with device discovery and management. In one implementation, network manager 140 may automatically retrieve configuration files from devices 130 and provide the configuration files to user terminal 110 (e.g., over a wired or wireless interface). In another implementation, network manager 140 may perform device discovery within network 120 based on a connectivity analysis received from user terminal 110. In still another implementation, network manager 140 may provide a connection point to network 120 to allow user terminal 110 to perform device discovery within network 120 based on the connectivity analysis.

In an implementation described herein, user terminal 110 may receive device configuration files for each of devices 130 within network 120. The device configuration files may be stored within a memory associated with (or accessible by) user terminal 110. User terminal 110 may analyze the configuration files to identify network connectivity of each device 130 identified in the configuration files. User terminal 110 may calculate connectivity (e.g., IP addresses) and may perform a search of the local files to verify each calculated address. Results of the connectivity analysis may then be used to perform optimized discovery of network 120. For example, implementations described herein may utilize information from the connectivity analysis to minimize an amount of Simple Network Management Protocol (SNMP) queries, pings, or port scans during live network discovery. In one implementation, results from the connectivity analysis and results from the live network discovery may be consolidated based on confidence levels of various types of device and/or connectivity information. Results from the optimized network discovery may be presented to users in a variety of sortable formats. Furthermore, user terminal 110 may present a graphical representation of network connectivity.

Although FIG. 1 shows example components of environment 100, in other implementations, environment 100 may include fewer components, different components, differently arranged components, and/or additional components than those depicted in FIG. 1. Alternatively, or additionally, one or more components of environment 100 may perform one or more other tasks described as being performed by one or more other components of environment 100.

Figure 2:
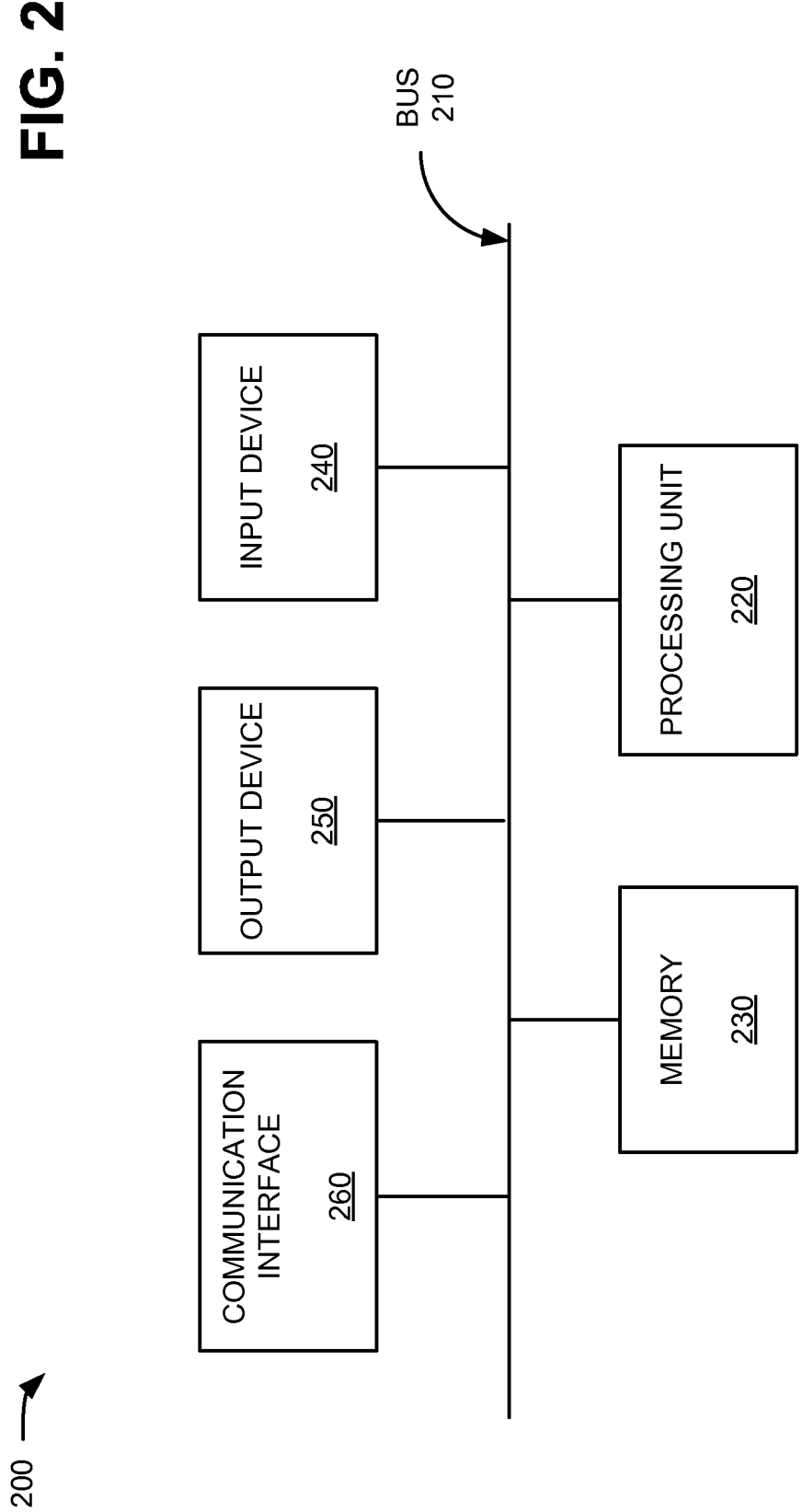
FIG. 2 is a diagram illustrating example components of a device that may correspond to one or more devices depicted in FIG. 1.

FIG. 2 is a diagram of example components of a device 200 that may correspond to one or more devices of environment 100. In one implementation, device 200 may include one or more devices. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, or the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of environment 100.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
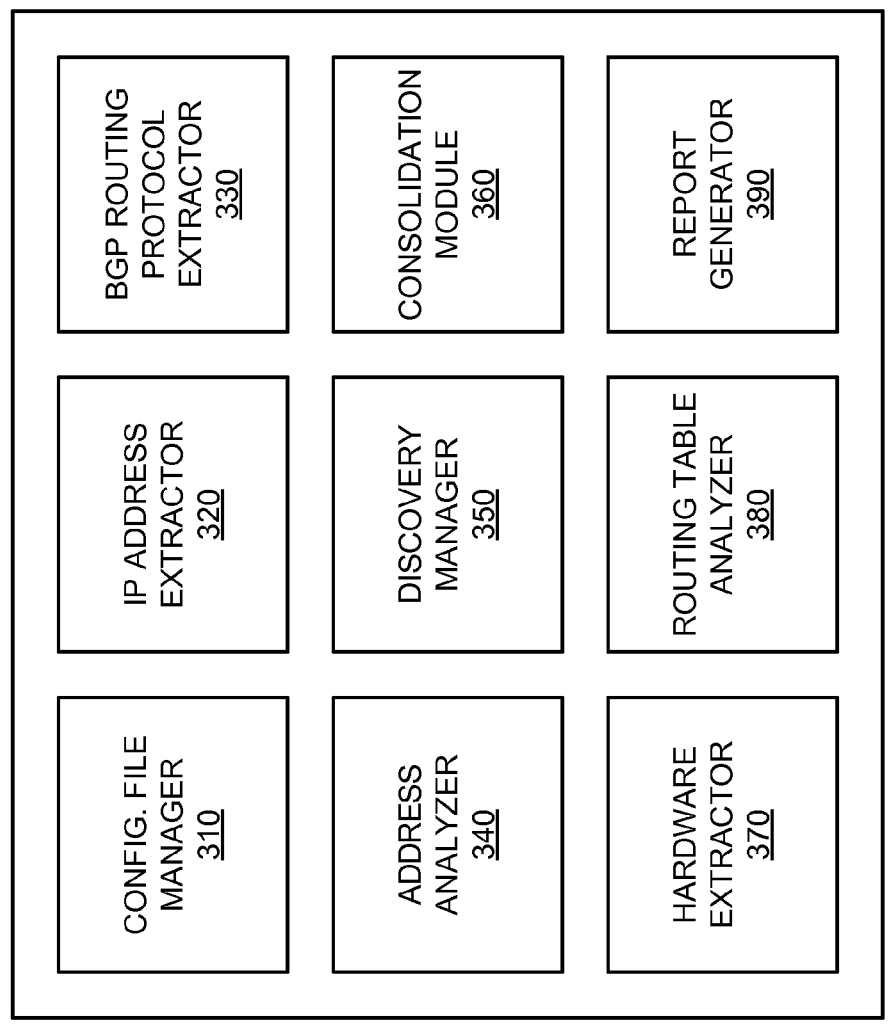
FIG. 3 is a diagram illustrating example functional components, of a user terminal of FIG. 1, that provide for connectivity analysis.
Figure 7:
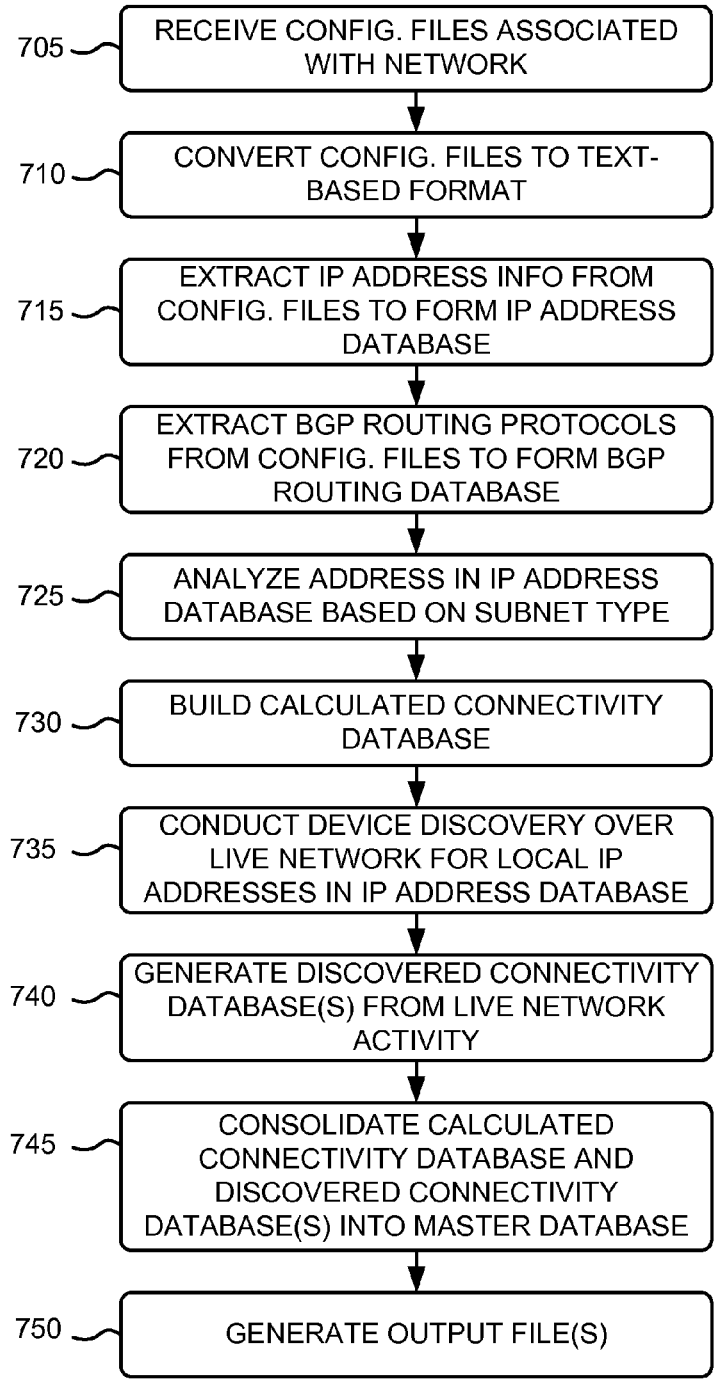

FIG. 3 is a diagram illustrating example functional components, of user terminal 110, that provide for connectivity analysis. In one implementation, the functions described in connection with FIG. 3 may be performed by one or more components of device 200 (FIG. 2). As shown in FIG. 3, user terminal 110 may include a configuration file manager 310, an IP address extractor 320, a BGP routing protocol extractor 330, an address analyzer 340, a discovery manager 350, a consolidation module 360, a hardware extractor 370, a routing table analyzer 380, and a report generator 390.

Configuration file manager 310 may include hardware or a combination of hardware and software to receive, convert and/or store configuration files associated with network devices. For example, configuration file manager 310 may receive device configuration files for devices (e.g., devices 130) associated with a network to be analyzed. The device configuration files may be stored, for example, in a dedicated default folder identified by configuration file manager 310 (or otherwise indicated to configuration file manager 310 by a user). Configuration file manager 310 may receive the device configuration files, for example, as a manual transfer (e.g., using portable storage media) or via an automated system including a network interface. For device configuration files that do not conform to a text-based format, configuration file manager 310 may convert the files to a generic text-based format from known information.

IP address extractor 320 may include hardware or a combination of hardware and software to analyze configuration files and extract IP information from the configuration files. For example, IP address extractor 320 may analyze each configuration file stored by configuration file manager 310. Each device name, interface name, IP address, and associated sub-network (or subnet) masks may be retrieved and populated (e.g., by IP address extractor 320) to a separate field of a database or file. In one implementation, IP address extractor 320 may be configured to analyze network devices employing IPv4 subnets with various operating systems, such as Cisco IOS®, Cisco CatOS®, Juniper JUNOS®, Adtran Operating System (AOS), and Aruba Networks OS.

An example of an IP address data structure 400 that may be generated by IP address extractor 320 is shown in FIG. 4. Data structure 400 may be implemented, for example, in a single database, in multiple databases, or as separate tables. As described further herein, IP address extractor 320 may use multiple copies of IP address data structure 400 (referred to individually as "IP address data structure 400A," "IP address data structure 400B," etc., or generically as "IP address data structure 400") to perform calculations. As shown in FIG. 4, IP address data structure 400 may include a hostname field 410, an interface field 420, an IP address field 430, a mask field 440, and a variety of records or entries 450 associated with fields 410-440.

Hostname field 410 may include a label or device name that is assigned to a device (e.g., device 130) connected to the network to be analyzed by access terminal 110. Interface field 420 may include a label or interface name that is assigned to a type of interface associated with the device. A device with multiple interfaces may include a separate device name associated with each interface name. IP address field 430 may include an IP address associated with the device identified in device name field 410. Mask field 440 may include an indication of the size of a routing prefix for the IP address in the corresponding IP address field 430. The size of the routing prefix may be indicated using, for example, classless inter-domain routing (CIDR) notation. Although CIDR notation (e.g., "192.168.1.0/24") is referred to generally herein, in other implementations, a routing prefix may be expressed as a dot-decimal representation (e.g., "255.255.255.0").

Although FIG. 4 shows example information that may be provided in data structure 400, in other implementations, data structure 400 may contain less, different, differently-arranged, or additional information than depicted in FIG. 4.

Returning to FIG. 3, IP address extractor 320 may provide entries 450 for hostname field 410, interface field 420, IP address field 430, and mask field 440 based on data directly listed in the configuration files obtained by configuration file manager 310.

BGP routing protocol extractor 330 may include hardware or a combination of hardware and software to analyze the configuration files and extract BGP information from the configuration files. BGP routing protocol extractor 330 may analyze each configuration file stored by configuration file manager 310. Based on the analysis, BGP routing protocol extractor 330 may identify operational routing protocols. BGP routing protocol extractor 330 may be configured to analyze network devices employing various operating systems, consistent with operating systems supported by IP address extractor 320. Each device name, BGP local autonomous system number (ASN), neighbor IP address, and remote ASN may be retrieved and populated, by BGP routing protocol extractor 330, to a separate field of a database or file.

An example of a BGP routing data structure 500 that may be generated by BGP routing protocol extractor 330 is shown in FIG. 5. Data structure 500 may be implemented, for example, in a single database, in multiple databases, or as separate tables. As shown in FIG. 5, BGP routing data structure 500 may include a hostname field 510, a BGP local ASN field 520, a neighbor IP address field 530, a remote ASN field 540, and a variety of records or entries 550 associated with fields 510-540.

Hostname field 510 may include a label or device name that is assigned to a device (e.g., device 130) connected to the network to be analyzed by user terminal 110. BGP local ASN field 520 may include an ASN that uniquely identifies the network/autonomous system number with which the corresponding device name in hostname field 510 is associated. Neighbor IP address field 530 may include an IP address associated with a corresponding device connected to the device identified in hostname field 510. Remote ASN field 540 may include an ASN that uniquely identifies the network with which the corresponding IP address in neighbor IP address field 530 is associated.

Although FIG. 5 shows example information that may be provided in data structure 500, in other implementations, data structure 500 may contain less, different, differently-arranged, or additional information than depicted in FIG. 5.

Returning to FIG. 3, BGP routing protocol extractor 330 may populate data structure 500 with entries 550 for hostname field 510, BGP local ASN field 520, neighbor IP address field 530, and remote ASN field 540 based on data directly listed in the configuration files obtained by configuration file manager 310.

Address analyzer 340 may include hardware or a combination of hardware and software to evaluate data in IP address data structure 400 and BGP routing data structure 500. In one implementation, address analyzer 340 may also supplement IP address data structure 400 and/or BGP routing data structure 500 with additional data. For example, address analyzer 340 may analyze each IP address in IP address data structure 400. In one implementation, as described further herein, address analyzer 340 may analyze devices in IP address data structure 400 based on subnet mask types and may provide supplemental information to generate a supplemented IP address data structure.

An example supplemented IP data structure that may be generated by address analyzer 340 is shown in FIG. 6 and described further below. As shown in FIG. 6, supplemented IP address data structure 600 may include hostname field 410, interface field 420, IP address field 430, mask field 440, first remote host field 610, first remote interface field 620, and first remote IP address field 630. Hostname field 410, interface field 420, IP address field 430, and mask field 440 may include features described above in connection with, for example, FIG. 4.

First remote host field 610 may include a label or device name that is assigned to a corresponding device connected to the device identified in hostname field 410. Similarly, first remote interface field 620 may include an IP address associated with the corresponding device identified in remote host field 610, and first remote IP address field 630 may include an IP address associated with the device identified in first remote host field 610. Additional fields (not shown) may include device names, interface types, and IP addresses for other devices connected to the corresponding device identified in hostname field 410. For example, if a local device is found to have remote connectivity with more than one remote device, additional sets of remote host fields, remote interface fields, and remote IP address fields may be included, within supplemented IP address data structure 600, for each additional remote device.

Although FIG. 6 shows example information that may be provided in data structure 600, in other implementations, data structure 600 may contain less, different, differently-arranged, or additional information than depicted in FIG. 6.

Returning to FIG. 3, when address analyzer 340 identifies a subnet mask of /32 or /0 in mask field 440 of IP address database 400, address analyzer 340 may associate the corresponding device (e.g., in hostname field 410) with self-connectivity. As shown in FIG. 6, address analyzer 340 may update supplemented IP address data structure 600 with a self-connectivity (e.g., by adding a "SELF" entry to first remote host field 610, first remote interface field 620, and first remote IP address field 630 of data structure 400), as indicated by reference number 640.

When address analyzer 340 identifies a subnet mask of /30 or /31 in mask field 440 of IP address data structure 400, address analyzer 340 may calculate a remote IP address. In one implementation, address analyzer 340 may search all sites (e.g., a table of all IP addresses) to verify the calculated remote IP address. For example, address analyzer 340 may apply a binary search algorithm to an ordered array of previously extracted IP addresses to quickly match the calculated address to a previously extracted IP address known within the set of configurations. If a directly connected device is found, the remote hostname, the remote interface name, and the remote IP address may be appended to the corresponding first remote host field 610, first remote interface field 620, and first remote IP address field 630 of supplemented IP address data structure 600. For example, as indicated by reference number 650 of FIG. 6, address analyzer 340 may append, to entries for a device having a hostname "ashburn-wan-rtr2" (e.g., in hostname field 410) with a mask of "/30" (e.g., in mask field 440), entries of "ashburn-core-esw2", "GigabitEthernet5/8", and "10.xxx.255.78".

If the search for all sites does not find a directly connected device, each subnet for the device may be compared to known IP addresses (e.g., publically registered IP addresses or known private IP addresses such as addressing defined within IETF RFC 1918 and known to be used for carrier WAN connectivity) of service providers, such as Verizon®, AT&T®, Sprint®, British Telecom®, etc. When an IP address is found on a service provider's IP addressing subnet, the remote device may be labeled as a carrier WAN interface. For example, as indicated by reference number 660 of FIG. 6, address analyzer 340 may append, to entries for a device having a hostname "chespotrtr0001" (e.g., in hostname field 410) with a mask of "/30" (e.g., in mask field 440), entries "ATTWAN", "CARRIER PE INT", and "10.XXX.101.33" in first remote host field 610, first remote interface field 620, and first remote IP address field 630, respectively, of supplemented IP address data structure 600.

If the search for all sites does not find a directly connected device and no match with a service provider's IP address is found, address analyzer 340 may search for matches based on a BGP remote ASN. More particularly, address analyzer 340 may open BGP routing data structure 500 and may search for the calculated remote IP address within BGP routing data structure 500. If there is a match in BGP routing data structure 500 and if the corresponding remote ASN found in BGP routing data structure 500 is that of a known service provider, the interface may be labeled as being directly connected to the WAN carrier. For example, as indicated by reference number 670 of FIG. 6, address analyzer 340 may append, to entries for a device having a hostname "chespotrtr0201" (e.g., in hostname field 410) with a mask of "/30" (e.g., in mask field 440), entries "ATTWAN", "CARRIER PE INT", and "10.xxx.101.57" in first remote host field 610, first remote interface field 620, and first remote IP address field 630, respectively, of supplemented IP address data structure 600.

When address analyzer 340 identifies a subnet mask of less than /30 and more than /0 in mask field 440 of IP address data structure 400, address analyzer 340 may calculate a network number (e.g., the first number of an IP subnet) and a broadcast address (e.g., the last number of an IP subnet) for a pairing defined by the IP address in IP address field 430 and the subnet mask in mask field 440. More particularly, address analyzer 340 may determine if a device is directly connected when the calculated network number, calculated broadcast address and subnet mask are all equal and the IP address configured on the subject device is not equal. A duplicate copy of data structure 400 may be created for search purposes. For purposes of this description, one copy of data structure 400 will be referred to as data structure 400A and another copy of data structure 400 will be referred to as data structure 400B. The above calculation may be applied to all extracted IP address and subnet mask pairs defined within data structure 400A and data structure 400B. For example:

Row 1 of data structure 400A and its associated data may be compared to Row 1 of data structure 400B;

Row 1 of data structure 400A and its associated data may be compared to Row 2 of data structure 400B;

Row 1 of data structure 400A and its associated data may be compared to Row 3 of data structure 400B; and so forth.

The above pattern may be repeated for each row of database 400A.

When a direct connection is determined based on the comparison of data structure 400A and data structure 400B described above, address analyzer 340 may update supplemented IP address data structure 600 to include the additional information. For example, as indicated by reference number 680 of FIG. 6, address analyzer 340 may append, to entries for a device having a hostname "ashburn-gk1" (e.g., in hostname field 410) with a mask of "/24" (e.g., in mask field 440), entries "ashburn-core-esw2", "Vlan200", and "172.xx.162.2" in first remote host field 610, first remote interface field 620, and first remote IP address field 630, respectively, of supplemented IP address data structure 600.

If analysis of the IP addresses and subnet masks in IP address data structure 400 fails to identify a connection for a particular device, address analyzer 340 may leave blank corresponding field entries, in supplemented IP address data structure 600, for first remote host field 610, first remote interface field 620, and first remote IP address field 630, as indicted by reference number 690.

Discovery manager 350 may include hardware or a combination of hardware and software to conduct targeted device discovery over a live network based on calculated information extracted from the device configuration files. For example, discovery manager 350 may analyze IP data structure 400 and/or supplemented IP address data structure 600 using live network discovery techniques. In one implementation, all local IP addresses in supplemented IP address data structure 600 may be queried, on the live network, using a particular communication sequence. First, discovery manager 350 may determine if there is connectivity to a device (e.g., device 130) associated with a local IP address (e.g., in IP address field 430). For example, discovery manager 350 may issue an Internet Control Message Protocol (ICMP) ping message to device 130. If no response to the ICMP ping message is received, device 130 may be deemed unconnected. If device 130 responds to the ICMP ping message, an attempt to communicate with the device 130, via protocols such as telnet protocol, Simple Network Management Protocol (SNMP), or secure shell (SSH) protocol may be initiated via automated methods.

If the attempt to communicate (e.g., via protocols such as telnet, SNMP, or SSH) results in a connection, discovery manager 350 may issue commands such as show address resolution protocol (ARP) table, show CDP (Cisco Discovery Protocol) neighbor, and show IP EIGRP (Enhanced Interior Gateway Routing Protocol) neighbor, of device 130, that maps IP addresses to physical hardware (e.g., media access control (MAC)) addresses. Discovery manager 350 may scan the retrieved ARP table and extract MAC addresses. Discovery manager 350 may compare the MAC addresses to a known hardware vendor database (e.g., generated from an IEEE-defined organizationally unique identifier (OUI) data). If the hardware vendor is a known networking gear manufacturer (e.g., there is a match between a first portion of the device MAC address and an OUI), discovery manager 350 may store the IP address(es) for the device in a device discovered data structure—telnet/SSH. The device discovered data structure—telnet/SSH may include, for example, information similar to that described above with respect to data structure 600 of FIG. 6.

If no response to the telnet and/or SSH attempts is received, discovery manager 350 may initiate live queries via protocols such as SNMP in which the ARP table may be extracted from the device. Discovery manager 350 may scan the extracted ARP table and extract MAC addresses. Discovery manager 350 may compare the MAC addresses from the extracted ARP table to the known hardware vendor database (e.g., based on the OUI data). If the hardware vendor is a known networking gear manufacturer, discovery manager 350 may store the IP address(es) for the device in another device discovered data structure—SNMP. The device discovered data structure—SNMP may include, for example, information similar to that described above with respect to data structure 600 of FIG. 6.

If the attempt to communicate via SNMP queries is not successful, discovery manager 350 may initiate a port scan of the remote device. The port scan may conduct a scan (e.g., using known software applications) to probe the remote device for open/closed TCP/IP ports. Discovery manager 350 may store port scan results for the device in a port scan results database. In one implementation, the device discovered data structure—telnet/SSH, the device discovered data structure—SNMP, and the port scan results database may be included as a single data structure with an additional field to identify whether discovery information for a particular device was discovered via methods such as telnet/SSH, SNMP or TCP/IP port scan methods. In another implementation, only the device discovered data structure—telnet/SSH and the device discovered data structure—SNMP may be combined.

Consolidation module 360 may include hardware or a combination of hardware and software to merge data structures from address analyzer 340 and discovery manager 350. For example, consolidation module 360 may merge entries from the calculated connectivity data structure (e.g., supplemented IP address data structure 600), the device discovered data structure—telnet/SSH, and the device discovered data structure—SNMP in to a single master data structure. In one implementation, entries from data structures generated by address analyzer 340 and discovery manager 350 may be consolidated based on assigned confidence levels. Confidence levels may be assigned based on the source and/or method from which the data was obtained. For example, confidence scores may be assigned to data as follows:

| Data/information category | Confidence Score |
|---|---|
| Information retrieved from current device configurations (from calculated connectivity data structure) | 90 |
| Information retrieved from CLI/telnet/SSH access (from device discovered data structure - telnet/SSH) | 70 |
| Information retrieved via SNMP methods (from device discovered data structure - SNMP) | 50 |
| Information retrieved from outdated device configurations (from calculated connectivity data structure) | 10 |

Thus, using the assigned confidence scores shown above, consolidation module 360 may merge data from the calculated connectivity data structure, the device discovered data structure—telnet/SSH, and the device discovered data structure—SNMP. When connectivity information for a particular device exists in more than one of these data structures, consolidation module 360 may, for example, include (e.g., in the master data structure) only the connectivity information with the highest confidence score. That is consolidation module 360 may overwrite conflicting data for the same IP address based on a higher confidence score. In another implementation, consolidation module 360 may include in the master data structure all data from the calculated connectivity data structure, the device discovered data structure—telnet/SSH, and/or the device discovered data structure—SNMP and provide (e.g., in a separate field) a confidence score associated with the connectivity information for each device.

Hardware extractor 370 may include hardware or a combination of hardware and software to collect additional device information from configuration files (e.g., the configuration files for each of devices 130 within network 120). For example, hardware extractor 370 may scan each device configuration file for "show version" and/or detailed device hardware information output. Hardware extractor 370 may generate a separate data structure (e.g., database) of the additional device information, such as device manufacturer, model, serial number, operating system (OS), OS version, and feature set per device. In one implementation, the data set may be used by report generator 390 to, for example, generate network discovery reports that are supplemented with device information.

Routing table analyzer 380 may include hardware or a combination of hardware and software to parse routing table from various devices. For example, routing table analyzer 380 may provide an interface to allow a user to select/copy a routing table (e.g., a routing table based on known vendor protocols such as a Cisco™, Adtran™ or Juniper™ IP Routing table). Routing table analyzer 380 may extract subnets, next hop addresses, protocol, admin distance, and/or and metrics from the routing table. In one implementation, routing table analyzer 380 may store the sorted data in a viewable file (e.g., ParsedRoutingTable.csv) in a directory specified by the user. In another implementation, routing table analyzer 380 may display the sorted data on the screen of user terminal 110. Information extracted by routing table analyzer 380 may be found useful in aiding in the selection of available management IP addressing.

Report generator 390 may include hardware or a combination of hardware and software to generate a particular file or a series of files upon selection by a user of a network analysis feature. Report generator 390 may retrieve information from one or more files and/or data structures of configuration file manager 310, IP address extractor 320, BGP routing protocol extractor 330, address analyzer 340, discovery manager 350, consolidation module 360, hardware extractor 370, and/or routing table analyzer 380. For example, a user of user terminal 110 may select from a menu of available reports. Reports may be generated, for example, as text-based output files, spreadsheets, or another file format.

Output files available for selection from report generator 390 may include, for example, all extracted local and remote BGP ASNs; all calculated and identified device connectivity; all extracted Cisco router-based dynamic host configuration protocol (DHCP) server configurations per device; indications of particular features, such as Appletalk, DECnet, Dial-Peers, data link switching (DLSw), internetwork packet exchange (IPX), CryptoKeys, CryptoMaps, and Synchronous Data Link Control (SDLC) (e.g., each marked as "detected" or "not detected"); all configured IP helper addresses; all IP routing protocols configured; extracted Cisco-based ISDN basic rate interface (BRI) service profile ID (SPID) numbers per device, per interface; all identified multi-protocol label switching (MPLS) WAN links per device, per interface; detailed IP multicast configurations per device; all extracted quality-of-service (QoS) policies per device, per interface; all configured static routes; and all subnets configured and identified within the configurations. In another implementation, report generator 390 may also provide automatically-generated WAN and/or LAN connectivity diagrams. In still another implementation, report generator 390 may include a "find" feature that permits a user to search for particular terms and/or devices of one or more files and/or data structures of configuration file manager 310, IP address extractor 320, BGP routing protocol extractor 330, address analyzer 340, discovery manager 350, consolidation module 360, hardware extractor 370, and/or routing table analyzer 380.

Although FIG. 3 shows example functional components of user terminal 110, in other implementations, user terminal 110 may include fewer functional components, different functional components, differently arranged functional components, and/or additional functional components than depicted in FIG. 3. Alternatively, or additionally, one or more functional components of user terminal 110 may perform one or more other tasks described as being performed by one or more other functional components of user terminal 110.

FIGS. 7-10 are flow charts of an example process 700 for performing device discovery according to an implementation described herein. Process 700 may be performed by user terminal 110. In another implementation, some or all of process 700 may be performed by one or more other devices including or excluding user terminal 110.

Process 700 may include receiving configuration files associated with a network (block 705) and converting the configuration files to a text-based format (block 710). For example, user terminal 110 may receive device configuration files for devices (e.g., devices 130) associated with a network (e.g., network 120) to be analyzed. The device configuration files may be stored, for example, in a dedicated folder identified by configuration file manager 310. User terminal 110 may receive the device configuration files, for example, as a manual transfer (e.g., using portable storage media) or via an automated system including a network interface. For device configuration files that do not conform to a text-based format, user terminal 110 may convert the files to a generic text-based format from known information.

Process 700 may include extracting IP address information from the configuration files to form an IP address database (block 715) and extracting BGP routing protocols from the configuration files to form a BGP routing database (block 720). For example, user terminal 110 (e.g., IP address extractor 320) may analyze each configuration file stored by configuration file manager 310. Each device name, interface name, IP address, and associated sub-network (or subnet) masks may be retrieved and populated to a separate field of a database or file. In one implementation, IP address extractor 320 may be configured to analyze network devices employing various operating systems, such as Cisco IOS®, Cisco CatOS®, Juniper JUNOS®, Adtran Operating System (AOS), and Aruba Networks OS. User terminal 110 (e.g., BGP routing protocol extractor 330) may analyze each configuration file stored by configuration file manager 310. Routing protocols in operation may be identified. Each device name, BGP local ASN, neighbor IP address, and remote ASN may be retrieved and populated to a separate field of a database or file.

Process 700 may include analyzing addresses in the IP address database based on subnet type (block 725). For example, user terminal 110 (e.g., address analyzer 340) may sort subnet masks included in IP address data structure 400 and analyze different categories of subnet masks. Address analyzer 340 may also supplement IP address data structure 400 and/or BGP routing data structure 500 with additional data. For example, address analyzer 340 may analyze each IP address in IP address data structure 400 and add supplemental information regarding calculated device connections. Analyzing addresses in the IP address database based on subnet type is described further in connection with FIGS. 8A-8C.

Process 700 may include building a calculated connectivity database (block 730). For example, user terminal 110 (e.g., address analyzer 340) may compile the analysis of the IP database 400 to form supplemented IP address data structure 600. Additionally, in one implementation, user terminal 110 may compile other routing protocol information, such as QoS policies and/or hardware information, collected (e.g., by hardware extractor 360) from the configuration files, to associate with each network device.

Process 700 may include conducting device discovery over a live network for local IP addresses in the IP address database (block 735) and generating one or more discovered connectivity databases from the live network activity (block 740). For example, user terminal 110 (e.g., discovery manager 350) may analyze IP data structure 400 and/or supplemented IP address data structure 600 using live network discovery techniques. In one implementation, all local IP addresses in supplemented IP address data structure 600 may be queried, on the live network, using a particular communication sequence. Conducting device discovery over a live network is described further in connection with FIG. 9.

Process 700 may include consolidating the calculated connectivity database and the one or more discovered connectivity databases into a master database (block 745). For example, user terminal 110 (e.g., consolidation module 360) may merge entries from the calculated connectivity data structure (e.g., supplemented IP address data structure 600), the device discovered data structure—telnet/SSH, and the device discovered data structure—SNMP in to a single master data structure. In one implementation, entries from data structures generated by address analyzer 340 and discovery module 350 may be consolidated based on assigned confidence levels. Confidence levels may be assigned based on the source and/or method from which the data was obtained. When connectivity information for a particular device exists in more than one of these data structures, consolidation module 360 may, for example, include (e.g., in the master data structure) only the connectivity information with the highest confidence score.

Process 700 may include generating one or more output files (block 750). For example, user terminal 110 (e.g., report generator 390) may generate a particular file or a series of files upon a network analysis selection. For example, a user of user terminal 110 may select from a menu of available reports. Reports may be generated, for example, as text-based output files, spreadsheets, or another file format. Output files available for selection may include, for example, all extracted local and remote BGP ASNs; all calculated and identified device connectivity; per interface; all identified MPLS WAN links per device, per interface; detailed IP multicast configurations per device; all extracted QoS policies per device, per interface; all configured static routes; and all subnets configured and identified within the configurations. In another implementation, report generator 390 may provide WAN and/or LAN diagrams.

Figure 8A:
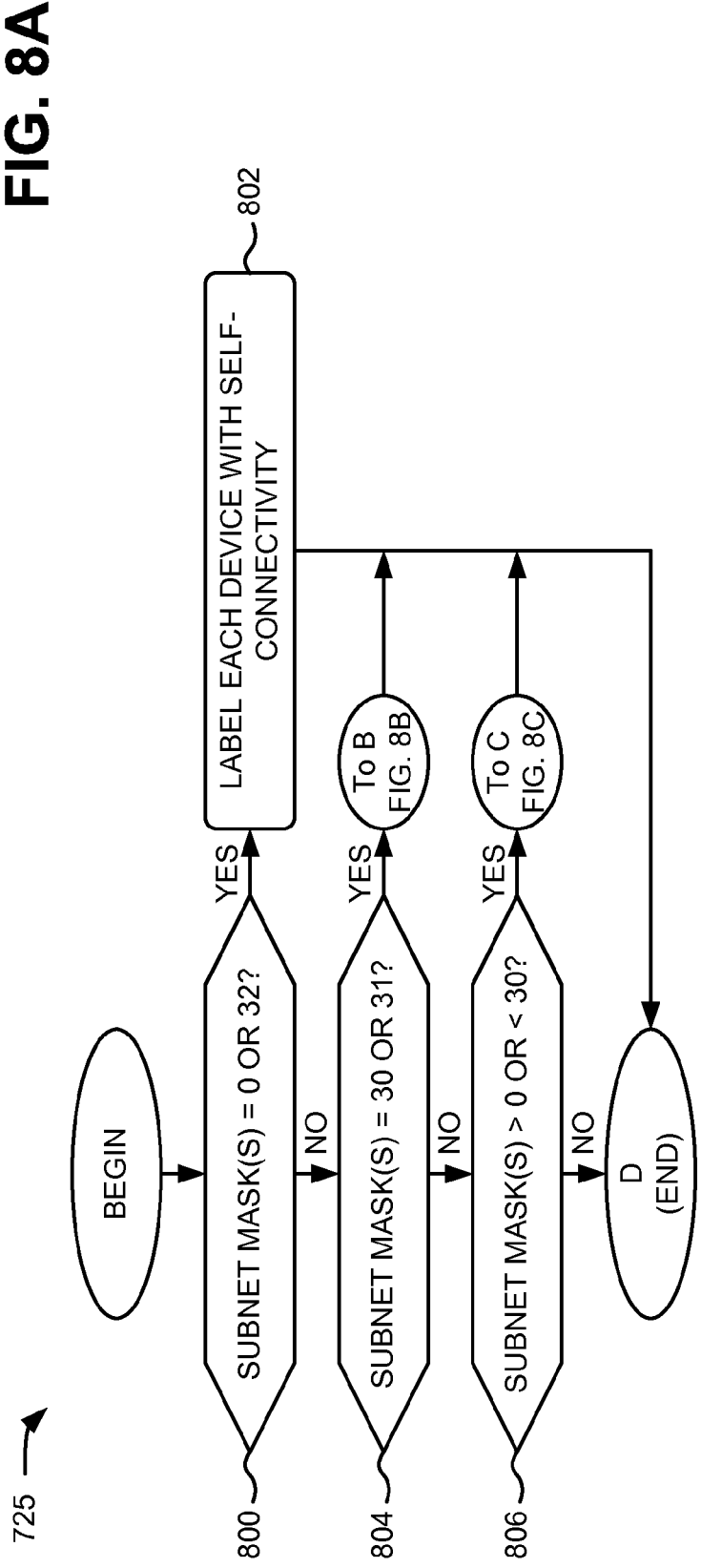

Process block 725 may include the process blocks depicted in FIGS. 8A-8C. As shown in FIG. 8A, process block 725 may include determining if the subnet mask of one or more addresses in the IP address database is either /0 or /32 (block 800). If the subnet mask of one or more addresses in the IP address database is either /0 or /32 (block 800—YES), each associated device may be labeled with self connectivity (block 802). For example, as described above in connection with FIG. 3, user terminal 110 (e.g., address analyzer 340) may analyze each IP address in IP address data structure 400. When address analyzer 340 identifies a subnet mask of /32 or /0 in mask field 440 of IP address data structure 400, address analyzer 340 may associate the corresponding device (e.g., in hostname field 410) with self-connectivity. As shown in FIG. 6, address analyzer 340 may update supplemented IP address data structure 600 with a self-connectivity, as indicated by reference number 640.

If no other subnet masks in the IP address database are either /0 or /32 (block 800—NO), it may be determined if the subnet mask of one or more addresses in the IP address database is either /30 or /31 (block 804). If the subnet mask of one or more addresses in the IP address database is either /30 or /31 (block 804—YES), process block 725 may proceed to FIG. 8B. Referring to FIG. 8B, a remote IP address may be calculated (block 810), and, if the calculated IP address is within a known carrier space (block 812—YES), the remote address may be labeled as a carrier WAN (block 814). For example, address analyzer 340 may calculate a remote IP address for each device with a subnet of /30 or /31. Each subnet for the corresponding remote device may be compared to known IP addresses of service providers (e.g., registered addresses or known private addresses). When an IP address is found on a service provider's IP addressing subnet, the remote device may be labeled as a carrier WAN interface (e.g., as shown in entry 660 of FIG. 6).

If the calculated IP address is not within a known carrier space (block 812—NO), the BGP routing database may be searched for a matching carrier BGP ASN (block 816), and, if the calculated IP address is a neighbor of a carrier BGP ASN (block 818—YES), the remote address may be labeled as a carrier WAN (block 814). For example, if the search for all sites does not find a directly connected device and no match with a service provider's registered IP address is found, address analyzer 340 may search for matches based on a BGP remote ASN. More particularly, address analyzer 340 may open BGP routing data structure 500 and may search for the calculated remote IP address within BGP routing data structure 500. If there is a match in BGP routing data structure 500 and if the corresponding remote ASN found in BGP routing data structure 500 is that of a known service provider, the interface may be labeled as being directly connected to the WAN carrier.

If the calculated IP address is not a neighbor of a carrier BGP ASN (block 818—NO), the IP database may be searched for a matching IP address (block 820), and, if a matching remote IP address is found (block 822—YES), the remote address may be labeled with a hostname (block 824). For example, address analyzer 340 may apply a binary search algorithm and search all sites in the IP database to verify the calculated remote IP address. If a directly connected device is found, the remote hostname, remote interface name, and the remote IP address may be appended to the corresponding first remote host field 610, first remote interface field 620, and first remote IP address field 630 of supplemented IP address data structure 600.

If a matching remote IP address is not found (block 822—NO), no connection type for the calculated IP address may be determined (block 826). For example, address analyzer 340 may leave blank first remote host field 610, first remote interface field 620, and first remote IP address field 630 of supplemented IP address data structure 600.

If there are other devices with subnet masks of /30 or /31 to analyze (block 828—YES), process 700 may repeat from block 726. If there are no other remote devices with subnet masks of /30 or /31 to analyze (block 828—NO), process block 725 may return to point D of FIG. 8A.

Returning to FIG. 8A, if no other subnet masks in the IP address database are either /30 or /31 (block 804—NO), it may be determined if the subnet mask of one or more addresses in the IP address database is greater than 0 but less than 30 (block 806). If the subnet mask of one or more addresses in the IP address database is greater than 0 but less than 30 (block 806—YES), process block 725 may proceed to FIG. 8C. Referring to FIG. 8C, a network number and broadcast address for the IP address subnet mask pair may be calculated (block 830), and the IP address database may be searched for a matching mask, network number, and/or broadcast address (block 832). For example, when address analyzer 340 identifies a subnet mask of less than /30 and more than /0 in mask field 440 of IP address database 400, address analyzer 340 may calculate a network number (e.g., the first number of the IP subnet) and a broadcast address (e.g., a last number of the IP subnet) for the remote IP address, subnet mask pair associated with a local device. Address analyzer 340 may search each address in IP address database 400.

If a matching subnet mask is found (block 834—YES), if a matching network number is found (block 836—YES), if a matching broadcast address is found (block 838—YES), and if the calculated IP address does not equal an IP address in the IP address database (block 840—YES), a connection may be identified and remote hostname, remote interface name, and remote IP address field may be populated (block 842). For example, address analyzer 340 may compare the calculated network number and broadcast address for one of the remote IP addresses with each site in IP database 400. When the subnet mask, network number, and broadcast address are equal and the IP address is not, the device may be identified as directly connected. If a directly connected device is found, the remote hostname, remote interface name, and the remote IP address may be appended to, for example, the corresponding first remote host field 610, first remote interface field 620, and first remote IP address field 630 of supplemented IP address data structure 600.

If a matching subnet mask is not found (block 834—NO), if a matching network number is not found (block 836—NO), if a matching broadcast address is not found (block 838—NO), or if the calculated IP address equals an IP address in the IP address database (block 840—NO), process block 725 may include determining if there are other devices with subnet masks of greater than /0 and less than /30 to analyze (block 844). For example, if any of the subnet mask, network number, and broadcast address are not equal, or the IP address is equal, a connection type for the device may not be determined and address analyzer 340 may proceed to analyze another address, if necessary.

If there are other devices with subnet masks greater than /0 and less than /30 to analyze (block 844—YES), process block 725 may return to block 830 to calculate a network number and broadcast address for another of the remote IP addresses. If there are no other devices with subnet masks greater than /0 and less than /30 to analyze (block 844—NO), process block 725 may return to point D of FIG. 8A. Returning to FIG. 8A, if no other addresses in the IP address database are greater than 0 but less than 30 (block 806—NO), process block 725 may be completed.

Process block 735 may include the process blocks depicted in FIG. 9. As shown in FIG. 9, process block 735 may include checking for connectivity of a first local IP address (block 905) and determining if there is a response to the check that indicates connectivity (block 910). For example, user terminal 110 (e.g., discovery manager 350) may determine if there is connectivity to a device (e.g., device 130) associated with a local IP address (e.g., in IP address field 430). For example, discovery manager 350 may issue an ICMP ping message to device 130.

If there is no connectivity response (block 910—NOT CONNECTED), process block 735 may return to block 905 to check for connectivity for a next local IP address. If there a connectivity response (block 910—CONNECTED), a telnet or SSH session may be initiated with the connected device (block 915). For example, if no response to the ICMP ping message is received, user terminal 110 (e.g., discovery manager 350) may determine that device 130 is unconnected. If device 130 responds to the ICMP ping message, user terminal 110 (e.g., discovery manager 350) may attempt to communicate with the device 130, via telnet protocol or secure shell (SSH) protocol.

If the telnet or SSH session is successfully initiated (block 920—YES), an APR table may be requested from the remote device (block 925), the ARP table may be scanned and a MAC address extracted (block 930), the extracted MAC address may be compared to known hardware vendor data (block 935), and the local IP address may be stored in a telnet/SSH database, if a match is found for a known hardware vendor (block 940). For example, if the telnet or SSH attempt results in a connection, user terminal 110 (e.g., discovery manager 350) may issue one or more commands (e.g., to device 130) to show the ARP table of device 130. Discovery manager 350 may scan the retrieved ARP table and extract MAC addresses. Discovery manager 350 may compare the MAC addresses to a known hardware vendor database (e.g., generated from OUI data). If the hardware vendor is a known networking gear manufacturer (e.g., there is a match between a first portion of the device MAC address and an OUI), discovery manager 350 may store the IP address(es) for the device in a device discovered data structure—telnet/SSH.

If a telnet or SSH session is not successfully initiated (block 920—NO), it may be determined that if SNMP access can be successfully initiated (block 945). If SNMP access cannot be successfully initiated (block 945—NO), a port scan of the connected device may be conducted and the port scan results stored in a port scan discovery database (block 950). For example, user terminal 110 (e.g., discovery manager 350) may initiate a port scan, and the port scan results may be stored in a port scan database.

If SNMP access is successfully initiated (block 945—YES), an ARP table may be generated via SNMP queries to the remote device (block 955), the ARP table may be scanned and a MAC address extracted (block 960), the extracted MAC address may be compared to known hardware vendor data (block 965), and the local IP address may be stored in a SNMP discovery database, if a match is found for a known hardware vendor (block 970). For example, if no response to the telnet and/or SSH attempts is received, user terminal 110 (e.g., discovery manager 350) may initiate SNMP queries, and the ARP table may be extracted via SNMP methods. Discovery manager 350 may scan the extracted ARP table and extract MAC addresses. Discovery manager 350 may compare the MAC addresses from the extracted ARP table to the known hardware vendor database (e.g., based on the OUI data). If the hardware vendor is a known networking gear manufacturer, discovery manager 350 may store the IP address(es) for the device in a device discovered data structure—SNMP.

Process block 745 may include the process blocks depicted in FIG. 10. As shown in FIG. 10, process block 745 may include assigning confidence scores to the calculated connectivity database and the discovered connectivity databases (block 1000), and copying the database with the highest confidence scores and designating the copy as a master (block 1005). For example, user terminal 110 (e.g., consolidation module 360) may assign confidence levels based on the source and/or method from which the data was obtained. For example, a confidence score of 90 may be assigned to current data in the calculated connectivity database, a confidence score of 70 may be assigned to the device discovered data structure—telnet/SSH, a confidence score of 50 may be assigned to the device discovered data structure—SNMP, and a confidence score of 90 may be assigned to outdated data in the calculated connectivity database. Consolidation module 360 may make a copy of the calculated connectivity database to use as a master database.

Entries from the database with the second highest confidence score may be applied to missing and/or outdated entries in the master (block 1010). For example, user terminal 110 (e.g., consolidation module 360) may apply entries from the device discovered data structure—telnet/SSH to missing entries and/or outdated entries (e.g., information retrieved from outdated device configurations) in the copy of the calculated connectivity database.

Entries from the database with the third highest confidence score may be applied to missing and/or outdated entries in the master (block 1015), and the updated master may be stored (block 1020). For example, user terminal 110 (e.g., consolidation module 360) may apply entries from the device discovered data structure—SNMP to missing entries and/or outdated entries that may remain (e.g., after data from the device discovered data structure—telnet/SSH is applied) to the copy of the calculated connectivity database. The updated copy of the calculated connectivity database may be stored (e.g., in a memory of user terminal 110) as the master database.

Systems and/or methods described herein may retrieve a set of configuration files of devices associated with a network to be analyzed and may extract, from the set of configuration files, IP address information to form an IP address database. The systems and/or methods may extract, from the set of configuration files, BGP routing protocols to form a BGP routing database. The systems and/or methods may analyze the IP address database and the BGP routing database to generate a database of calculated network connection information for the devices associated with the network. The systems and/or methods may conduct live network discovery, on the network and based on the IP address database, to generate a database of discovered connection information, and may merge the database of calculated network connection information and the database of discovered connection information to form a master database from which output files may be generated.

The calculated network connection information may be determined without establishing a connection between a device performing the connectivity analysis and the devices associated with the network. Thus, the systems and/or methods may be less intrusive to an existing customer network than other known network discovery methods. For example, SNMP queries may be minimized and performance of the network discovery may be improved by utilizing available resources prior to any live queries.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7-10, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as a "component" that performs one or more functions. These components may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by a computing device, the method comprising:
    extracting, by the computing device and from multiple configuration files of devices associated with a network, Internet protocol (IP) address information to form an IP address database;
    analyzing, by the computing device, the IP address database to determine calculated network connection information for the devices associated with the network, where the calculated network connection information is determined without network connectivity between the computing device and the devices associated with the network;
    generating, by the computing device, a calculated connectivity database that includes the calculated network connection information;
    conducting, by the computing device, live network discovery, on the network and based on the IP address database, to identify discovered connectivity information;
    generating, by the computing device, one or more discovered connectivity databases that include the discovered connectivity information;
    merging, by the computing device, the calculated connectivity database and the one or more discovered connectivity databases to form a master connectivity database that includes network connection information for the devices associated with the network, where the merging includes assigning confidence scores to data that is stored in the calculated connectivity database and the one or more discovered connectivity databases; and
    generating, by the computing device, an output file based on the master connectivity database.

2. The method of claim 1, further comprising:
    receiving multiple configuration files of the devices associated with the network; and
    converting one or more of the multiple configuration files from a non-text-based format into a text-based format.

3. The method of claim 1, where the network is one of a wide area network (WAN) or a local area network (LAN).

4. The method of claim 1, where conducting the live network discovery comprises:
    determining if there is connectivity with a device associated with an IP address in the IP address database,
    initiating one of a telnet or secure shell (SSH) session when there is connectivity with the device,
    obtaining, via the telnet or SSH session and when the telnet or SSH session is successfully initiated, an address resolution protocol (ARP) table from the device,
    extracting a media access control (MAC) address from the ARP table,
    comparing the MAC address with known hardware vendor address information, and
    storing the IP address in the one or more discovered connectivity databases when the MAC address corresponds to the hardware vendor address information.

5. The method of claim 4, where conducting the live network discovery comprises:
    initiating, when the telnet or SSH session is not successfully initiated, Simple Network Management Protocol (SNMP) queries to generate the ARP table.

6. The method of claim 5, where the one or more discovered connectivity databases include:
    a database for local IP addresses discovered via the telnet or SSH session, and
    another database for local IP addresses discovered via the SNMP queries.

7. The method of claim 1, where merging the calculated connectivity database and the one or more discovered connectivity databases further includes:
    overwriting conflicting data for the same IP address based on a higher confidence score.

8. The method of claim 1, further comprising:
    extracting, from the multiple configuration files, border gateway protocol (BGP) routing protocols to form a BGP routing database;
    where analyzing the IP address database to determine calculated network connection information further comprises analyzing the BGP routing database.

9. A device, comprising:
    a memory to store:
    a plurality of instructions, and
    multiple configuration files of devices associated with a network; and
    a processor to execute instructions in the memory to:
    retrieve, from the memory, the multiple configuration files of devices associated with a network,
    extract, from the multiple configuration files, Internet protocol (IP) address information to form an IP address database,
    extract, from the multiple configuration files, border gateway protocol (BGP) routing protocols to form a BGP routing database,
    analyze the IP address database and the BGP routing database to generate a database of calculated network connection information for the devices associated with the network, wherein the calculated network connection information is determined without establishing network connectivity between the device and the devices associated with the network, conduct live network discovery, on the network and based on the IP address database, to generate a database of discovered connection information, merge the database of calculated network connection information and the database of discovered connection information to form a master database, where the merging includes assigning confidence scores to data that is stored in the calculated connectivity database and the one or more discovered connectivity databases, and generate an output file based on the master database.

10. The device of claim 9, where the processor is further to execute instructions to:

convert one or more of the multiple configuration files from a non-text-based format into a text-based format.

11. The device of claim 9, where, when conducting live network discovery, the processor is to:

initiate, with a device in the network, one of a telnet or secure shell (SSH) session, obtain, via the telnet or SSH session and when the telnet or SSH session is successfully initiated, an address resolution protocol (ARP) table from the device, and obtain, via Simple Network Management Protocol (SNMP) queries and when the telnet or SSH session is not successfully initiated, the ARP table from the device.

12. The device of claim 11, where, when conducting live network discovery, the processor is further to:

extract a media access control (MAC) address from the ARP table, compare the MAC address with known hardware vendor address information, and store an IP address, associated with a device in the network, in the one or more discovered connectivity databases when the MAC address corresponds to the hardware vendor address information.

13. The device of claim 9, where, when conducting live network discovery, the processor is further to:

determine, via an ICMP (Internet Control Message Protocol) ping, if there is connectivity with a device associated with an IP address in the IP address database.

14. The device of claim 9, where, when analyzing the IP address database, the processor is further to execute instructions to:

analyze each IP address, associated with the devices in the IP address database, based on a subnet mask.

15. The device of claim 14, where, when analyzing each IP address based on the subnet mask, the processor is further to execute instructions to:

calculate a remote IP address for subnet masks of /1 through /29 in the IP address database.

16. The device of claim 9, where, when merging the database of calculated network connection information and the database of discovered connection information, the processor is further to execute instructions to:

overwrite conflicting data, within the database of calculated network connection information and the database of discovered connection information, for the same IP address based on a higher confidence score.

17. The device of claim 9, where, when assigning confidence scores, the processor is further to:

assign a highest confidence score to calculated network connection information retrieved from current device configurations, assign a second highest confidence score to discovered connection information obtained via the telnet or secure shell (SSH) connection, assign a third highest score to discovered connection information obtained via the SNMP (Simple Network Management Protocol) queries, and assign a fourth highest score to calculated network connection information retrieved from outdated device configurations.

18. A non-transitory computer-readable medium that includes instructions for execution by one or more processors, the computer-readable medium comprising:

one or more instructions to extract, from multiple configuration files of devices associated with a network, Internet protocol (IP) address information to form an IP address database;

one or more instructions to extract, from the multiple configuration files, border gateway protocol (BGP) routing protocols to form a BGP routing database;

one or more instructions to analyze the IP address database and the BGP routing database to generate a database of calculated network connection information for the devices associated with the network;

one or more instructions to conduct live network discovery, on the network and based on the IP address database, to generate a database of discovered connection information;

one or more instructions to merge the database of calculated network connection information and the database of discovered connection information to form a master database, where the one or more instructions to merge include one or more instructions to assign confidence scores to data that is stored in the database of calculated network connection information and the database of discovered connection information; and one or more instructions to generate an output file based on the master database.

19. The non-transitory computer-readable medium of claim 18, where the database of calculated network connection information is generated without a connection between the one or more processors and the devices associated with the network.

20. The non-transitory computer-readable medium of claim 18, where the one or more instructions to conduct live network discovery further comprise:

one or more instructions to initiate, with a device in the network, one of a telnet or SSH session, one or more instructions to obtain, when the telnet or secure shell (SSH) session is successfully initiated, an address resolution protocol (ARP) table from the device via the telnet or SSH session, and one or more instructions to obtain, when the telnet or SSH session is not successfully initiated, the ARP table from the device via Simple Network Management Protocol (SNMP) queries.

* * * * *